United States Patent [19]

Constantine et al.

[11] 4,203,659

[45] May 20, 1980

[54] TRANSPARENCY STORAGE AND DISPLAY APPARATUS

[75] Inventors: Paul Constantine, New York; Melvyn Ettinger, East Meadow, both of N.Y.; Harry S. Rubin, Willow Grove, Pa.

[73] Assignee: Instructo/McGraw-Hill, Inc., Paoli, Pa.

[21] Appl. No.: 914,971

[22] Filed: Jun. 12, 1978

[51] Int. Cl.² ............................................. G03B 21/00
[52] U.S. Cl. .............................. 353/120; 353/DIG. 5
[58] Field of Search ................ 353/DIG. 5, 120, 121, 353/122; 35/DIG. 3; 40/361, 63 A

[56] References Cited

U.S. PATENT DOCUMENTS

| | | | |
|---|---|---|---|
| 3,524,703 | 8/1970 | Wright | 353/120 X |
| 3,537,792 | 11/1970 | Furniss et al. | 353/DIG. 5 |
| 3,609,026 | 9/1971 | Verebay | 353/120 |
| 3,709,590 | 1/1973 | Bisberg | 353/DIG. 5 |
| 3,895,453 | 7/1975 | Wright | 40/530 |

*Primary Examiner*—Harry N. Haroian
*Attorney, Agent, or Firm*—Darby & Darby

[57] ABSTRACT

An apparatus designed for the purpose of viewing transparencies on an overhead projector is disclosed. The apparatus incorporates a frame and the transparencies are retained by a portion of the frame defining a mounting member. Substantially all of the weight of the frame is concentrated in the mounting member and a member in opposed, spaced relationship to the mounting member. Tabs extending from the mounting member into the area circumscribed by the frame, in which area the transparencies are positioned for storage and display, serve to retain the transparencies in relative alignment.

12 Claims, 5 Drawing Figures

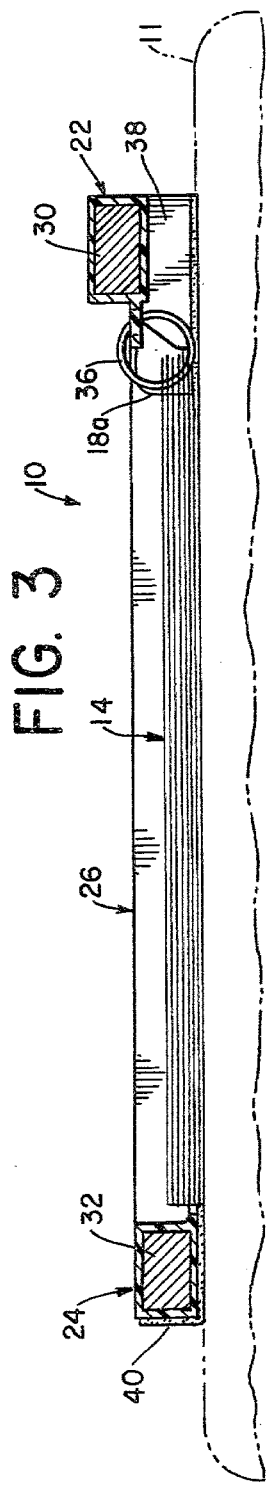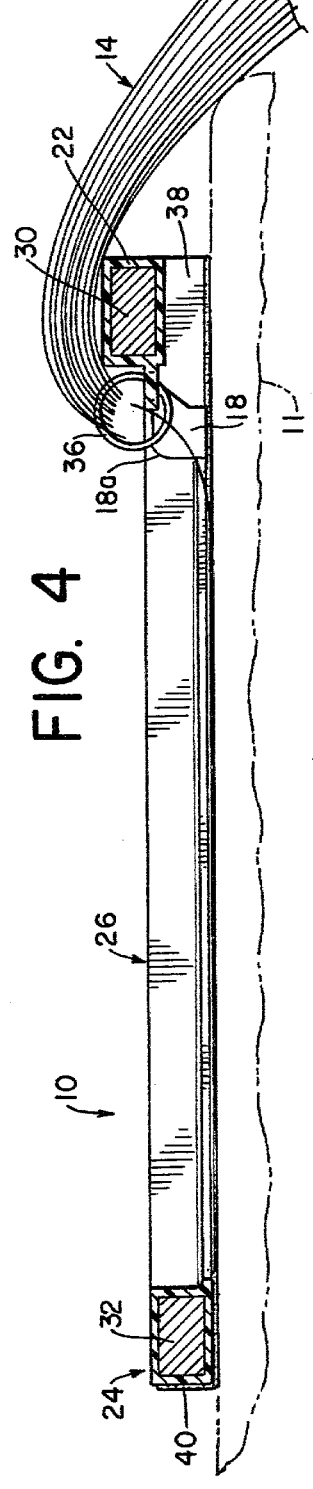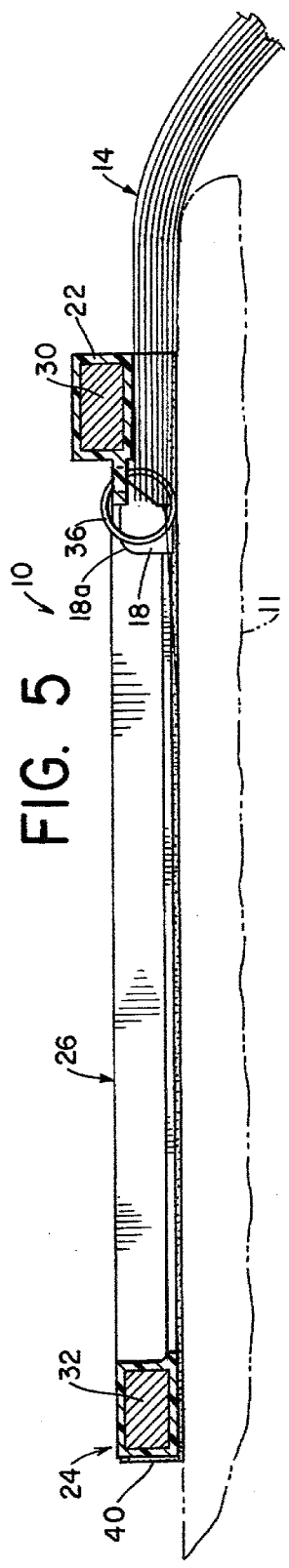

TRANSPARENCY STORAGE AND DISPLAY APPARATUS

BACKGROUND OF THE INVENTION

The invention relates generally to transparency projection and in particular to an apparatus designed to be used in combination with an overhead projector for projecting transparencies.

Transparencies and overhead projectors are widely used today during all sorts of lectures and presentations. In the field of education, courses are taught with the aid of carefully planned, progressive sets of transparencies which are specifically designed for that purpose, and it is usual for one or more such sets to be used at each course lecture. It has been found advantageous to bind each set of transparencies together in the general form of a book to facilitate repeated, sequential viewing. Typically, the bound transparencies are mounted in a folder or between covers for convenient storage.

Although it has been possible to provide inexpensive bound sets of transparencies which are convenient to store and view, it has been necessary also to provide auxiliary devices to receive and retain the transparencies in a stationary position on the display surface or stage of the projector for viewing. Such retaining devices have had to be relatively complex to provide the requisite stability, have often required various mechanisms to fasten them to the projector, and have had an adverse effect on the convenience, utility and cost of bound transparency sets.

Another problem encountered with existing bound transparency sets relates to overlaying a plurality of transparencies to achieve special effects. This requires that the transparencies be retained in close registry. It has been suggested that registry pins be provided for this purpose on the auxiliary retaining devices and that each transparency have apertures to receive the pins. Such an arrangement is inconvenient in use, because the operator often finds himself fumbling in the dark with transparencies in an attempt to place them on or remove them from the registry pins.

It is an object of the present invention to provide an improved apparatus for viewing transparencies on an overhead projector which obviates one or more of the problems found in the prior art.

It is a further object of the invention to provide an apparatus for storing transparencies which may be used to view the transparencies on a projector and which is not physically attached to the projector, yet remains stationary during use.

It is another object of the invention to provide an apparatus for storing transparencies which may be used directly on a projector stage to view the transparencies without any auxiliary retaining means.

It is a further object of the invention to provide a transparency storage and viewing apparatus which is compact and easily portable.

It is a still further object of the invention to provide an apparatus which can hold several transparencies in an aligned configuration so that two or more transparencies can be overlaid for viewing without interfering with the normal viewing operation.

It is also an object of the invention to provide an apparatus of the type described which is convenient and reliable in use, yet relatively inexpensive and simple in construction.

In accordance with an illustrative embodiment of the invention, a transparency storage and display apparatus is provided which incorporates a frame, and the transparencies are retained by a portion of the frame defining a mounting member. Substantially all of the weight of the frame is concentrated in the mounting member and a member in opposed, spaced relationship to the mounting member. Owing to the exceptional stability which results, the apparatus may be used for viewing the transparencies by simply placing it on top of an overhead projector without attachment to the projector. Hence, the single apparatus serves as a compact, portable storage means for the transparencies and, without modification or adjustment, can be used to view the transparencies. The apparatus also includes tabs which extend from the mounting member into the area circumscribed by the frame, in which area the transparencies are stored. These tabs lie in planes normal to the transparencies and are designed to fit into respective slits in the transparencies, so that the transparencies remain in an aligned configuration, which makes it possible to overlay them one upon another rather than viewing them sequentially.

The accompanying drawings illustrate a presently preferred embodiment of the invention and other objects, features and advantages of the invention will become apparent by reading the following detailed description in conjunction with them.

BRIEF DESCRIPTION OF THE DRAWINGS

In the drawings:

FIG. 3 is a sectional view, on an enlarged scale, of the invention taken along section line 3—3 of FIG. 2, the transparencies being shown in position for storage;

FIG. 4 is a sectional view similar to FIG. 3, the first transparency being in position for display and the remaining ones being folded out of the way in a position for subsequent display;

FIG. 5 is a sectional view similar to FIG. 3, the last transparency being in position for display and the remaining ones being shown folded under the mount in a position to avoid interference with the display operation.

DETAILED DESCRIPTION

Figure 1:
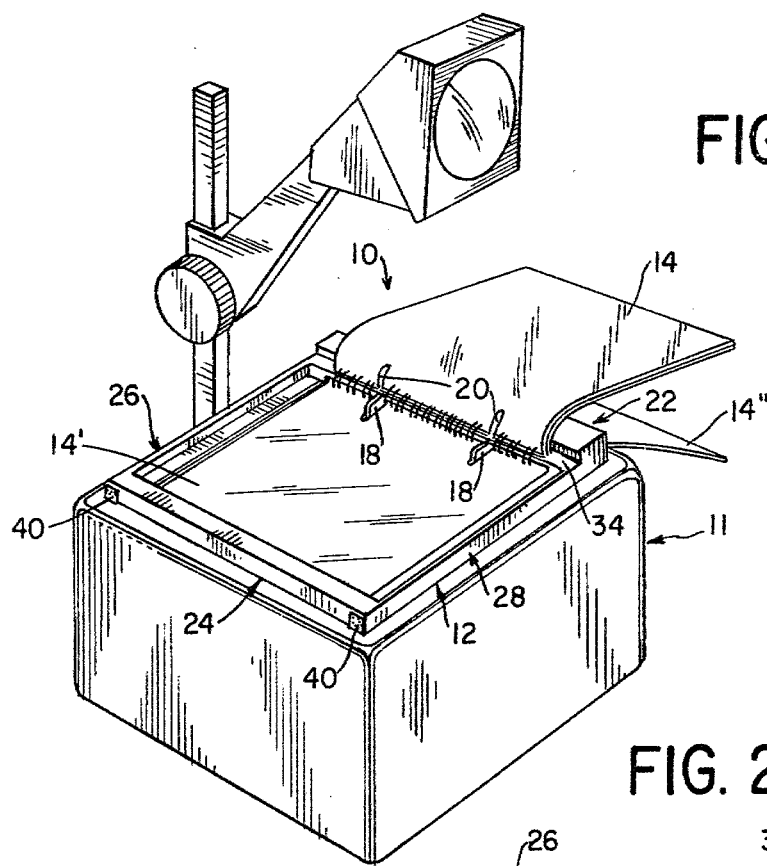
FIG. 1 is a perspective view of a transparency storage and viewing apparatus in accordance with the invention shown in use on top of a conventional overhead projector.
Figure 2:
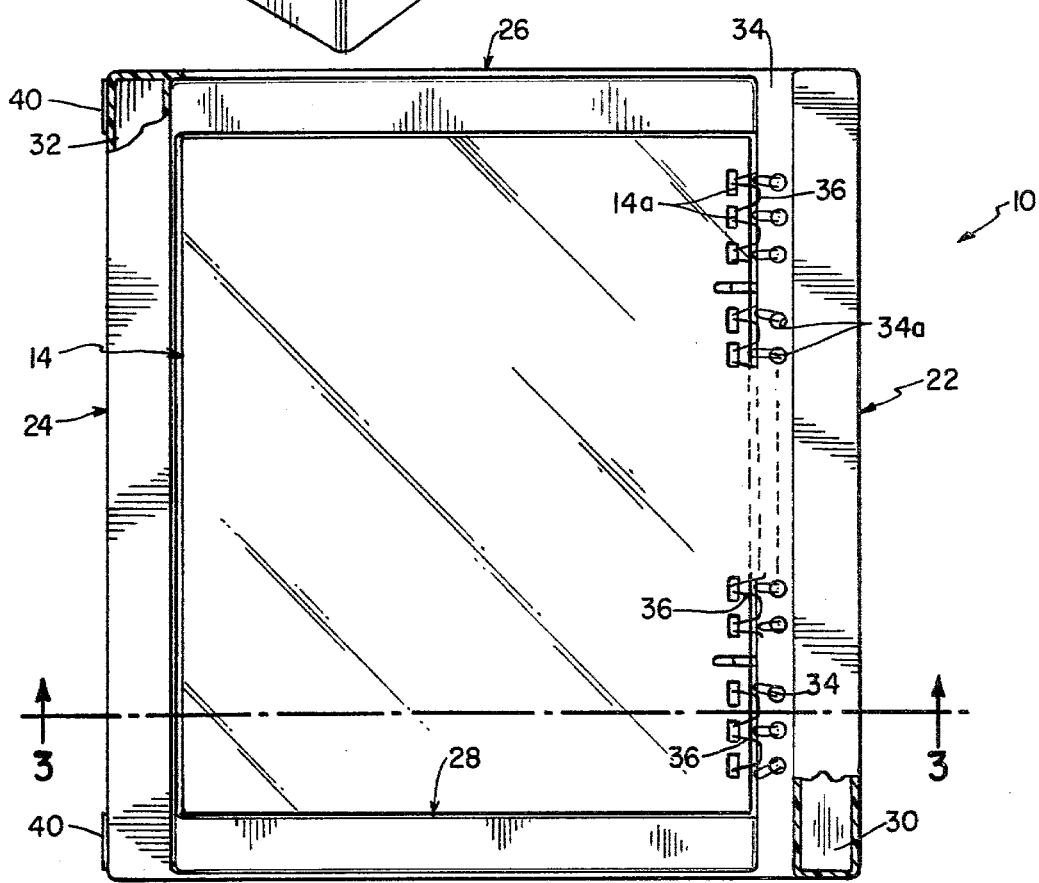
FIG. 2 is a top plan view of the apparatus of FIG. 1 in accordance with the invention.

Referring now to the details of the invention, FIG. 1 shows an apparatus 10, in accordance with the invention, supported on top of the stage or projection surface of a conventional overhead projector 11. Apparatus 10 incorporates a frame 12 to which the transparencies 14 are secured along an edge in stacked alignment. For storage, the transparencies are all positioned within the area 16 circumscribed by frame 12, in the manner of transparency 14'. The entire assembly is then conveniently stored, for example, in a carton or other container.

For viewing the transparencies, the apparatus 10 is rested on projector 11 as shown in FIG. 1. The transparencies 14 are all folded over the top of frame 12 in position to be away from projection surface 16. In turn, each transparency is brought to rest on surface 16 for display and is subsequently folded under frame 12 (see transparency 14") so as to be out of the way. Alternately, two or more transparencies may be overlaid for display. Under such circumstances, the guide tabs 18 cooperate with slits 20 in the transparencies to maintain the transparencies in alignment.

Frame 12 may be made of any rigid material by conventional methods, but is preferably molded from a sturdy plastic material. It includes: a mounting member 22, to which the transparencies 14 are secured, an opposing member 24 in opposed, spaced relationship to the mounting member; and the connecting members 26, 28 which join corresponding ends of the mounting and opposing members. The weight of the frame is substantially concentrated in the mounting and opposing members, as will be explained further below.

Mounting member 22 and opposing member 24 are both hollow and are filled with weights 30 and 32, respectively, which may for example, be bars of steel. These weights add stability and prevent apparatus 10 from shifting about on the projector 11 during use, as will be explained further below. Mounting member 22 also includes an inwardly projecting flange portion 34 which has a plurality of apertures 34a spaced along its length. These apertures are aligned with corresponding apertures 14a along an edge of each of the transparencies and conventional retaining means, such as a wire spiral 36, is utilized to connect transparencies 14 to mounting member 22. As can be seen in FIGS. 3–5, flange portion 34 is positioned so that its upper surface is flush with the tops of members 26 and 28 and the portion of the under surface of member 22 which is between members 26 and 28 is raised to form a passageway 38. Passageway 38 is dimensioned to be at least as high as the stack of transparencies 14 and to extend along member 22 for a distance at least as great as the width of the transparencies.

Mounting member 22 also includes a pair of planar tabs 18 which extend from flange portion 34 into area 16 and are normal to flange portion 34. Each tab is rounded in its upper corner 18a. Each of these tabs is dimensioned and positioned to fit snugly into a corresponding one of slits 20 in transparencies 14. As a result of this snug fit, a plurality of transparencies will be closely aligned when overlaid in area 16.

Connecting members 26, 28 join corresponding ends of members 22 and 24, thereby completing frame 12. Each of the connecting members is generally L-shaped in cross-section to provide maximum strength with minimum weight and their bottom surfaces cooperate with the bottom surface member 24 to define a bottom wall for the frame 12. Each of the connecting members includes a strip 40 of slip-resistant material, such as rubber, extending along its bottom surface and upward over the outer surface of opposing member 24 which forms part of the outer wall of frame 12. These strips aid in preventing movement of apparatus 10 on the stage of projector 11.

In operation, transparencies 14 are brought to the position shown in FIG. 4 prior to viewing. As each transparency is viewed it is flipped into position in area 16 so as to rest on the stage of projector 11. When this is done, tabs 18 are forced into slits 20, the curved corner 18a permits the page to be turned freely without jamming. Thus, overlaid transparencies will be aligned automatically without any special effort or attention on the part of the operator. After a transparency is viewed, the end of frame 12 which includes member 22 is raised and the transparency is tucked under member 22 into channel 38 (see transparencies 14 in FIG. 5). When this is done, tabs 18 are withdrawn from slits 20 and the portions of strips 40 which extend upward onto member 24 prevent the frame 12 from slipping on the stage. When the raised end of the frame is once again lowered, apparatus 10 is ready for viewing the next transparency. From the foregoing description it will be appreciated that while the operator uses the apparatus 10, transparencies automatically engage and disengage from tabs 20 and that this operation takes place without his attention and, in fact, could be done in total darkness without fumbling.

Keeping in mind that substantially all of the weight of frame 12 is concentrated in members 22 and 24, it will now be explained why this tends to stabilize the frame. There are two conditions of potential instability represented in FIGS. 4 and 5, respectively. When most or all of the transparencies are supported on member 22 as in FIG. 4, the weight of the transparencies exerts a clockwise moment on spring retainer 36 which tends to rotate the frame clockwise, thereby lifting the end with member 24. With the strips 40 lifted from the stage of the projector, traction is lost and the weight of the transparencies pulls the apparatus 10 to the right, causing it to fall off of the stage. Weight 32 is provided to counteract this rotation of frame 12.

When most or all of the transparencies are under member 22 as in FIG. 5, the overhanging portions of the transparencies droop downward owing to their weight and this tends to lift the opposite end of the transparencies, thereby lifting member 22. As before, traction is reduced when strips 40 are raised and the weight of the transparencies pulls apparatus 10 off of the stage. Weight 30 counteracts this tendency to lift member 22.

In a preferred embodiment a frame 12 having an overall weight of about 34 ounces was provided with up to about 40 transparencies of 4 mil milar and 30 layers of interleaved four point paper stock for masking. By experimentation, it was determined that making member 22 weigh about 18 ounces (53% of overall weight) and member 24 about 14 ounces (41% of overall weight) maximum stability could be achieved with minimum overall weight. In general, best results were obtained when about 50% of the overall weight was concentrated in member 22 and about 40% in member 24.

Although a preferred embodiment of the invention has been disclosed for illustrative purposes, those skilled in the art will appreciate that many additions, modifications and substitutions are possible without departing from the scope and spirit of the invention as defined by the accompanying claims. For example, frame 12 need not be rectangular but could assume any other shape which would substantially circumscribe area 16.

What is claimed is:

1. Apparatus adapted to be supported on a projection area of a viewing device for retaining transparencies, each having a predefined mounting edge, for storage and display comprising:
   a mounting member for holding the transparencies substantially along their mounting edges in general alignment;
   an opposing member in spaced relation to said mounting member;
   a first connecting member having first and second ends connected to corresponding ends of the mounting and opposing members; and a second connecting member having first and second ends connected to the other corresponding ends of the mounting and opposing members;

said members cooperating to form a frame dimensioned to circumscribe the periphery of said transparencies and having inner and outer walls, at least one top wall and at least one bottom wall for resting on the projection area of the viewing device, said mounting member holding the mounting edge of each transparency in a substantially constant position with respect to said bottom wall, said frame having means for concentrating its weight substantially in said mounting and opposing members;

said mounting member has a lower surface which is elevated with respect to the bottom wall of the frame, said lower surface cooperating with said connecting members to define a channel of sufficient height and width to receive in stacked arrangement all transparencies held by said mounting member.

2. Apparatus as defined in claim 1, wherein the weight of the mounting member is greater than that of the opposing member.

3. Apparatus as defined in claim 2, wherein the weight of the mounting member is approximately 50% of the total weight of the frame and the weight of the opposing member is approximately 40% of the total weight.

4. Apparatus adapted to be supported on a projection area of a viewing device for retaining transparencies for storage and display comprising:

a mounting member adapted to hold the transparencies in general alignment;

an opposing member in spaced relation to said mounting member;

a first connecting member having first and second ends connected to corresponding ends of the mounting and opposing members;

a second connecting member having first and second ends connected to the other corresponding ends of the mounting and opposing members;

said members cooperating to form a frame having inner and outer walls, at least one top wall and at least one bottom wall, said frame having its weight substantially concentrated in said mounting and opposing members; and at least one substantially planar tab extending from one of said members into the area circumscribed by the frame, each of said transparencies having slits in an edge thereof, each slit dimensioned and positioned to receive one of said tabs with a close fit so that said tabs serve closely to align overlaid transparencies into which they are inserted.

5. Apparatus as defined in claim 4, wherein said at least one tab extends from the mounting member.

6. Apparatus as defined in claim 1, further comprising a strip of slip resistant material secured along a portion of each of the connecting members defining a bottom wall of the frame.

7. Apparatus as defined in claim 1, wherein the strip extends upward to cover at least a portion of the outer wall of the frame.

8. Apparatus as defined in claim 1, wherein said mounting member has a lower surface which is elevated with respect to the bottom wall of the frame, said lower surface cooperating with said connecting members to define a channel of sufficient height and width to receive in stacked arrangement all transparencies held by said mounting member.

9. In an apparatus for retaining transparencies for storage and viewing, a frame circumscribing a predefined storage and viewing area, means mounting said transparencies to a mounting portion of said frame so as to be in general alignment and to be movable into and out of said storage and viewing area, and at least one substantially planar tab extending substantially normal to said transparencies from said frame into said storage and viewing area, said transparencies each having a slit positioned to correspond with one of said tabs and dimensioned to receive the same with a close fit, each slit extending to the margin of said transparency nearest the corresponding tab, each slit receiving and releasing the corresponding tab as a transparency is moved, respectively, into and out of said storage and viewing area so that transparencies are automatically closely aligned with other transparencies in said storage and viewing area as they are brought thereinto.

10. Apparatus in accordance with claim 9 wherein said at least one tab extends from said mounting portion.

11. Apparatus in accordance with claim 9 or 10 wherein said frame is rectangular and said mounting portion comprises a side member of the rectangle, said apparatus further comprising a strip of slip resistant material extending under each of the side members which is normal to the mounting portion and upward onto a peripheral surface of the frame.

12. Apparatus in accordance with claim 11 wherein the side members of the frame other than the mounting portion cooperate to define a bottom wall of the frame corresponding to their bottom surfaces, said mounting portion having a bottom surface which is elevated with respect to said bottom wall so as to form a channel capable of receiving all transparencies in stacked alignment.

* * * * *